US012415251B2

(12) United States Patent
Bayle

(10) Patent No.: US 12,415,251 B2
(45) Date of Patent: Sep. 16, 2025

(54) ADJUSTABLE LOCKING PLIERS

(71) Applicant: Stanley Black & Decker MEA FZE, Dubai (AE)

(72) Inventor: Julien Bayle, Besancon (FR)

(73) Assignee: Stanley Black & Decker MEA FZE, Dubai (AE)

( * ) Notice: Subject to any disclaimer, the term of this patent is extended or adjusted under 35 U.S.C. 154(b) by 358 days.

(21) Appl. No.: 16/927,132

(22) Filed: Jul. 13, 2020

(65) Prior Publication Data

US 2021/0008692 A1 Jan. 14, 2021

(30) Foreign Application Priority Data

Jul. 11, 2019 (EP) .................................... 19185834

(51) Int. Cl.

| | |
|---|---|
| ***B25B 7/12*** | (2006.01) |
| ***B25B 7/02*** | (2006.01) |
| ***B25B 7/10*** | (2006.01) |

(52) U.S. Cl.

CPC ................ *B25B 7/123* (2013.01); *B25B 7/02* (2013.01); *B25B 7/10* (2013.01)

(58) Field of Classification Search

CPC .............. B25B 7/123; B25B 7/02; B25B 7/10

See application file for complete search history.

(56) References Cited

U.S. PATENT DOCUMENTS

| | | | | | |
|---|---|---|---|---|---|
| 2,428,949 | A * | 10/1947 | Ward | B25B 13/40 | 81/367 |
| 2,825,525 | A * | 3/1958 | Kellam | F16K 7/063 | 81/367 |
| 2,988,941 | A * | 6/1961 | Ortman | B25B 7/123 | 81/344 |
| 3,170,345 | A * | 2/1965 | Poingt | B25B 7/18 | 81/343 |

(Continued)

FOREIGN PATENT DOCUMENTS

| | | | |
|---|---|---|---|
| CN | 2410082 | Y | 12/2000 |
| FR | 2736572 | A1 | 1/1997 |
| WO | 2008101259 | A1 | 8/2008 |

OTHER PUBLICATIONS

Extended European Search Report issued in EP Application No. 19185834.9 mailed on Jan. 22, 2020, 6 pages.

*Primary Examiner* — Hadi Shakeri

(74) *Attorney, Agent, or Firm* — Jordan IP Law, LLC; Todd A. Vaughn

(57) ABSTRACT

An adjustable locking pliers includes a stationary handle, a stationary jaw, an operating lever and a movable jaw. The jaw is coupled by an axis which is selectively displaceable to alter the jaws' gripping capacity. The operating lever is coupled to the movable jaw by a first pivot. The lever rear forms a movable handle. A spring biases rotation of the movable jaw about the axis away from the stationary jaw. An actuation rod having a series of teeth and a stop face is coupled to the operating lever by a second pivot part way (Continued)

along the operating lever and coupled to the stationary handle by means of a third pivot. A catch having a series of teeth and a stop face is pivotally coupled to the operating lever. The teeth of the actuation rod and the teeth of the catch are configured to engage each other to permit multiple clamping positions.

9 Claims, 14 Drawing Sheets

(56) References Cited

U.S. PATENT DOCUMENTS

| | | | | | |
|---|---|---|---|---|---|
| 4,602,535 | A | * | 7/1986 | Wiener | B25B 7/14 81/313 |
| RE32,614 | E | * | 3/1988 | Wilson | B25B 7/123 81/367 |
| 4,794,780 | A | * | 1/1989 | Battenfeld | H01R 43/042 81/383 |
| 5,850,768 | A | | 12/1998 | Chow | |
| 6,178,855 | B1 | | 1/2001 | Bally et al. | |
| 6,227,081 | B1 | | 5/2001 | Bally et al. | |
| 6,279,431 | B1 | | 8/2001 | Seber et al. | |
| 6,378,404 | B1 | | 4/2002 | Bally et al. | |
| 7,117,771 | B2 | | 10/2006 | Whiteford | |
| 2009/0178518 | A1 | | 7/2009 | Buchanan et al. | |
| 2012/0042709 | A1 | | 2/2012 | Polofsky | |
| 2012/0297938 | A1 | | 11/2012 | Lai | |
| 2015/0158151 | A1 | * | 6/2015 | Brown | B25B 7/18 81/365 |

* cited by examiner

ADJUSTABLE LOCKING PLIERS

CROSS-REFERENCE TO RELATED APPLICATIONS

This patent application claims priority to EP19185834.9, filed Jul. 11, 2019, which is hereby incorporated by reference in its entirety.

FIELD OF THE INVENTION

The present invention relates to an adjustable locking pliers of the type that allow a strong clamping force to be exerted for a long period of time, without intervention from the operator, on an object, or, more frequently, on two objects which need to be held together. More specifically, the present invention relates to an improved adjustable locking pliers having an improved latch lock mechanism capable of allowing the pliers to achieve multiple clamping positions by simply closing the handles.

BACKGROUND

Locking pliers are well known in the art. Patent publication number EP2826595 discloses a design of adjustable locking pliers that have been in production for several years. These locking pliers have advantages over previous models of locking pliers. For example, they have increased gripping capacity. They also avoid explosive reaction to the hands of the operator from the elastic energy contained within the clamped pliers. Despite these improvements, the locking pliers of EP2826595 experience the drawback of only having a single locking or clamping position. This limitation is due to the design of the lock latch mechanism.

The latch lock mechanism 116 of EP2826595 comprises an operating lever 124, the front end of which is coupled to the lower vertex of the movable jaw 114 by a first pivot 126 formed by a first axle. The midpoint of the operating lever 124 is coupled to the front end of an actuation rod 128 by a second pivot 130 formed by a second axle. The rear end of the operating lever 124 is elongate and forms a second, movable handle 132 situated underneath the stationary handle 110. Referring in particular to FIG. 1, the movable handle 132 is manually pivotable toward the stationary handle 110, in the direction of arrow A, and away from the handle 110, in the direction of arrow B.

As shown in FIG. 3, the front end of the actuation rod 128 has a engagement tooth 152, the front face of which forms an upper arc 154 of a circle that is centered on the second pivot 130, a lower arc 156 of a circle of smaller radius also centered on the second pivot 130, and a radial face 158 which connects the two arcs 154,156. The radial face 158, which constitutes an engagement face, extends substantially radial with respect to the second pivot 130.

The latch lock mechanism 116 also comprises a locking/unlocking catch 160 coupled to the operating lever 124 by an axle 162 located close to the second pivot 130. On its inner side, facing upwards towards the stationary handle 110, the catch 160 has a recess 164 delimited at the top by an upper triangular engagement tooth 166 and at the bottom by a lower triangular stop tooth 168. The upper face 169 of the stop tooth 168, which constitutes a stop face, extends substantially radial with respect to the axis of rotation of the axle 162.

The latch lock mechanism 116 comprises a traction spring 170 hooked under tension between a finger 172 on the operating lever 124 (located just behind the first pivot 126) and an eyelet 174 in the actuation rod 128 (located just above the second pivot 130).

The latch lock mechanism 116 comprises a double torsion spring 176 mounted upon the axle 162 and fixed to the catch 160. A protruding part **176*a* of the double torsion spring 176 acts upon the operating lever 124 such that the catch 160 is biased by the double torsion spring 176 to rotate in a clockwise direction E about the axle 162, as is shown in FIG. 3. The catch 160 forms a trigger which protrudes slightly from the movable handle 132**.

The latch lock mechanism 116 comprises a single torsion spring 178 the rear end **178*a* of which is mounted upon a finger 180 on the intermediate connecting part 112. A middle coil 178*b* of the single torsion spring 178 is unattached. A forward protruding part 178*c* of the single torsion spring 176 acts upon the dowel 120 such that the dowel 120 is biased by the single torsion spring 178 in a generally forward direction of arrow F, as is shown in FIG. 2. The forward bias of the single torsion spring 178 is only just enough to reliably retain the dowel 120 in a notch 150*a*-150*e*** when the jaws are unclamped.

When the locking pliers 102 is not in use, tension in the traction spring 170 pulls the second pivot 130 away from an imaginary line IL between the first 126 and third 148 pivots. This reduces the distance between the first 126 and third 148 pivots which causes the movable jaw 114 to pivot about the dowel 120 (in the anti-clockwise direction of arrow G) away from the stationary jaw 108 and the movable handle 132 to pivot about the first pivot 126 (in the direction of arrow B) away from the stationary handle 110. It also causes a reduction in a locking angle α enclosed by the first 126, second 130 and third 148 pivots. The jaws 108,114 are either in, or moving towards, an open position like that shown in FIG. 4. The radial face 158 of the actuation rod's engagement tooth 152 rests against the stop face 169 of the catch's stop tooth 168 and the catch's engagement tooth 166 rests against the upper arc 154 of the front face of the actuation rod 128. This prevents the two handles 110,132 from moving further apart from one another.

The lower part of the catch 160 forms a trigger which protrudes slightly beneath the movable handle 132. When the locking pliers 102 are in use, the operator, using all four fingers, begins to pull the movable handle 132 closer to the stationary handle 110 (in the direction of arrow direction A) which is wedged firmly in the palm of the operator's hand. The second pivot 130 moves towards the imaginary line IL between the first 126 and third 148 pivots. This increases the distance between the first 126 and third 148 pivots which causes the movable jaw 114 to pivot about the dowel 120 (in the clockwise direction of arrow H) towards the stationary jaw 108 and the movable handle 132 to pivot about the first pivot 126 (in the direction of arrow A) towards the stationary handle 110. The locking angle α gradually widens, and the movable jaw 114 rotates about the dowel 120. Thus, the jaws 108,114 move towards a closed position like that shown in FIG. 1 and begin to clamp an object. Tension in the traction spring 170 gradually increases. At the same time, the tip of the actuation rod's engagement tooth 152 moves closer to that of the catch's engagement tooth 166 while contact between the tip of the catch's engagement tooth 166 and the upper arc 154 of actuation rod's engagement tooth 152 and between the tip of the catch's stop tooth 168 and the actuation rod's lower arc 156 is sustained by the bias of the torsion spring 176. Throughout this movement, the catch 160 is immobilized with respect to the movable handle 132 so that the trigger may form a purchase for the operator's index finger.

By continuing to move the two handles 110,132 closer together, the operator firmly clamps the object between the jaws 108,114 and slightly increases the locking angle α to a degree at which the actuation rod's engagement tooth 152 snap-fastens behind the catch's engagement tooth 166, as is best shown in detail by FIG. 3. The upper face of the catch's engagement tooth 166 is substantially radial with respect to the second pivot 130. Stresses due to clamping plus tension in the traction spring 170 tend to reduce the locking angle α. However, the tip of the catch's engagement tooth 166 abuts the actuation rod's radial face 158 to prevent a reduction of the locking angle α. The locking pliers 102 has now reached a stable clamped position. The centre of the second pivot 130 has not passed the imaginary line IL between the first 126 and the third 148 pivots. The locking angle α is slightly less than 180 degrees. Typically the locking angle α is in the order of 170 to 175 degrees. In this position, the trigger protrudes further beneath the movable handle 132. The snap-fastening can be felt by the operator's index finger.

The double torsion spring 176 urges the catch 160 to pivot in a clockwise direction E about the axle 162. The engagement teeth 152,166 abut each another with a force which is substantially perpendicular to the imaginary line IL between the first 126 and third 148 pivots. If the operator pulls the two handles 110,132 even closer together, the movable handle's abutment point 184 will move into abutment with the actuation rod's abutment point 182 before the second pivot 130 passes the imaginary line IL between the first 126 and the third 148 pivots. This guarantees that the second pivot 130 never passes the imaginary line IL. Once the operator releases the movable handle 132, the locking pliers 102 adopts the stable clamped position under the bias of the traction spring 170. The lock mechanism 116 exerts a locking force LF in a clockwise direction about the dowel 120 which is counteracted by a clamping force CF between the jaws 108,114.

To release the object clamped between the jaws 108,114, the operator takes hold of the locking pliers 102, pulls the handles 110,132 slightly closer together until the movable handle's abutment point 184 moves into abutment with the actuation rod's abutment point 182. The operator presses a finger on the trigger 160 to disengage the engagement teeth 152,166 and then releases the movable handle 132 to allow the jaws 108,114 to open automatically. This opening is caused by tension in the traction spring 170 which tends to pull the first 126 and third 148 pivots together, push the second pivot 130 away from the imaginary line IL and rotate the movable jaw 114 away from the stationary jaw 108 in the anti-clockwise direction of arrow G. The most wide-open position is delimited by abutment between the catch's stop tooth 168 and the actuation rod's radial tooth 158.

Thus, an operator using the locking pliers of EP2826595 has to engage in trial & error in order to find the appropriate clamping setup position. This can be a time consuming process. It would be advantageous to have locking pliers with multiple intermediate locking positions, that would allow an operator to more quickly set up the locking pliers in an appropriate locking or clamping position. The locking pliers of the present invention include all of the advantages of EP2826595, while simultaneously providing the added benefit of allowing for multiple incremental locking or clamping positions.

SUMMARY OF THE INVENTION

In at least one embodiment of the present invention, there is provided a locking pliers including a stationary assembly having an elongated overall shape, wherein a rear end of the stationary assembly forms a stationary handle and a front end of the stationary assembly forms a stationary jaw. The locking pliers further include a movable assembly having an operating lever and a movable jaw, wherein the movable jaw is pivotally coupled to the stationary assembly by a jaw axis to enable clamping of an object between the movable and stationary jaws and wherein the operating lever has a front end that is pivotally coupled to the movable jaw by a first pivot and the operating lever has a rear end that forms a movable handle. The locking pliers also include a spring for biasing rotation of the movable jaw about the jaw axis away from the stationary jaw. Also included is an actuation rod having a series of teeth and a stop face on its front end, which is pivotally coupled to the operating lever by a second pivot part way along the operating lever, said actuation rod further includes a rear end pivotally coupled to the stationary handle by means of a third pivot and wherein the actuation rod and a portion of the operating lever that extends between the first and the second pivots defines a latch lock mechanism. Also included is a catch pivotally coupled to the operating lever and having a series of the teeth, a stop face and a trigger surface that is configured to be engaged by an operator in order to pivot the catch. The actuation rod and the operating lever each have abutment means and wherein the abutment means are mutually aligned to stop the latch lock mechanism from passing beyond a point of alignment of the first, second and third pivots upon movement of the movable handle toward the stationary handle during clamping. The invention is characterized in that the teeth of the actuation rod and the teeth of the trigger are configured to engage each another to permit multiple clamping positions wherein in each of said positions, the movable jaw and fixed jaw are held in a fixed clamped arrangement.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the root terms "include" and/or "have", when used in this specification, specify the presence of stated features, steps, operations, elements, and/or components, but do not preclude the presence or addition of at least one other feature, step, operation, element, component, and/or groups thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

For definitional purposes and as used herein, "connected" or "attached" includes physical or electrical, whether direct or indirect, affixed or adjustably mounted. Thus, unless specified, "connected" or "attached" is intended to embrace any operationally functional connection.

As used herein, "substantially," "generally," "slightly" and other words of degree are relative modifiers intended to indicate permissible variation from the characteristic so modified. It is not intended to be limited to the absolute value or characteristic which it modifies but rather possessing more of the physical or functional characteristic than its opposite, and approaching or approximating such a physical or functional characteristic.

In the following description, reference is made to the accompanying drawings which are provided for descriptive and illustration purposes as representative of specific exemplary embodiments in which the invention may be practiced. Given the following description of the specification and drawings, the apparatus, methods, and systems should become evident to a person of ordinary skill in the art. Further areas of applicability of the present teachings will become apparent from the description and illustrations provided herein. It is to be understood that other embodiments can be utilized and that structural changes based on presently known structural and/or functional equivalents can be made without departing from the scope of the invention.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying drawings.

Corresponding reference characters indicate corresponding parts throughout the several views. The exemplifications set out herein illustrate embodiments of the present invention, and such exemplifications are not to be construed as limiting the scope of the present invention in any manner.

These and other features of the invention will become apparent upon review of the following description of the present embodiments of the invention, taken into conjunction with the figures.

DETAILED DESCRIPTION

A detailed description of apparatuses, methods, and systems, consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure. An example implementation of a locking pliers 103 is shown in FIGS. 1-14. The example tool 103 illustrated in FIGS. 1-14 is a handheld locking plier, simply for ease of discussion and illustration. However, the principles to be described herein may be applied to other types of handheld tools that are operable in different modes such as, for example, use of the tool without the locking function.

Figure 1:
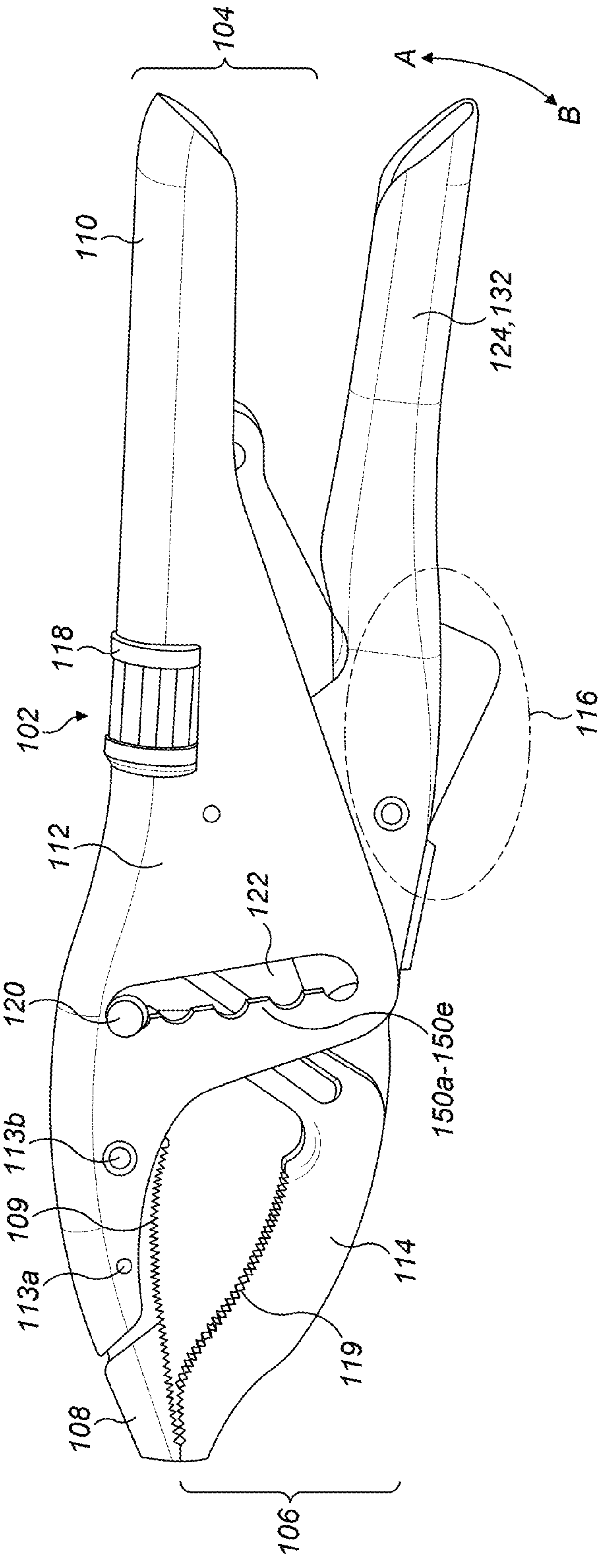
FIG. 1 Prior Art
FIG. 1 shows a side elevation view of locking pliers according to the prior art.
Figure 2:
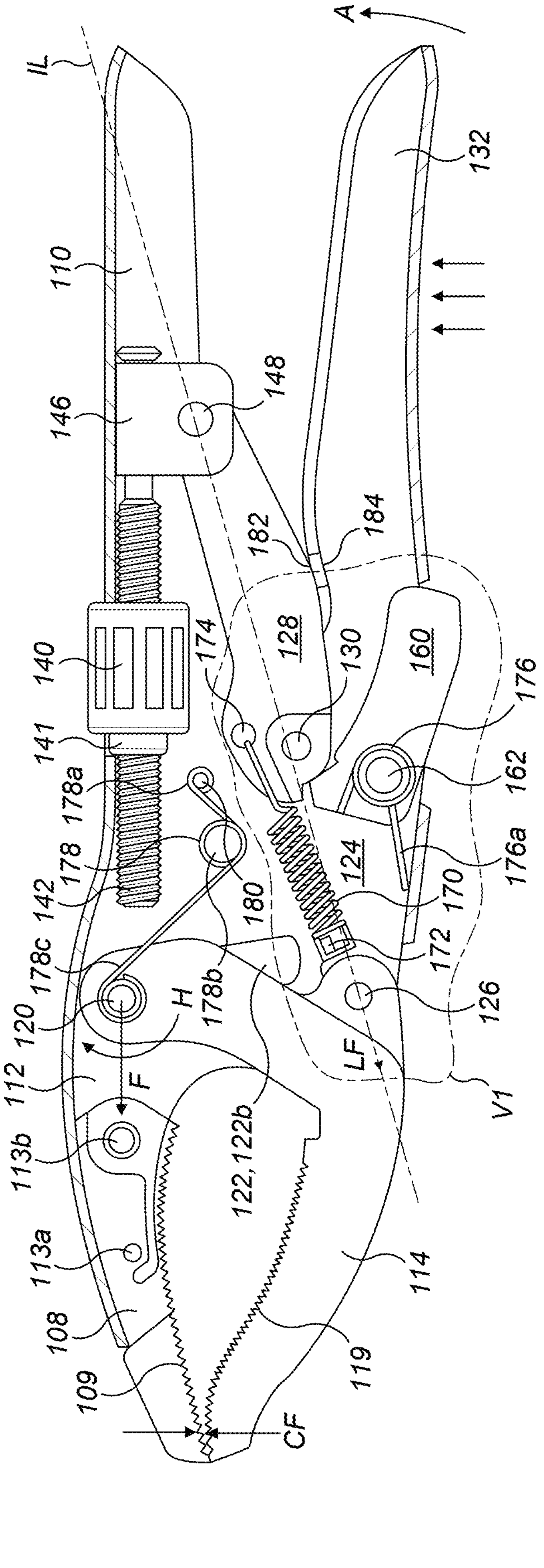
FIG. 2 Prior Art
FIG. 2 show a side cutaway view of locking pliers according to the prior art in the closed/clamped position.
Figure 3:
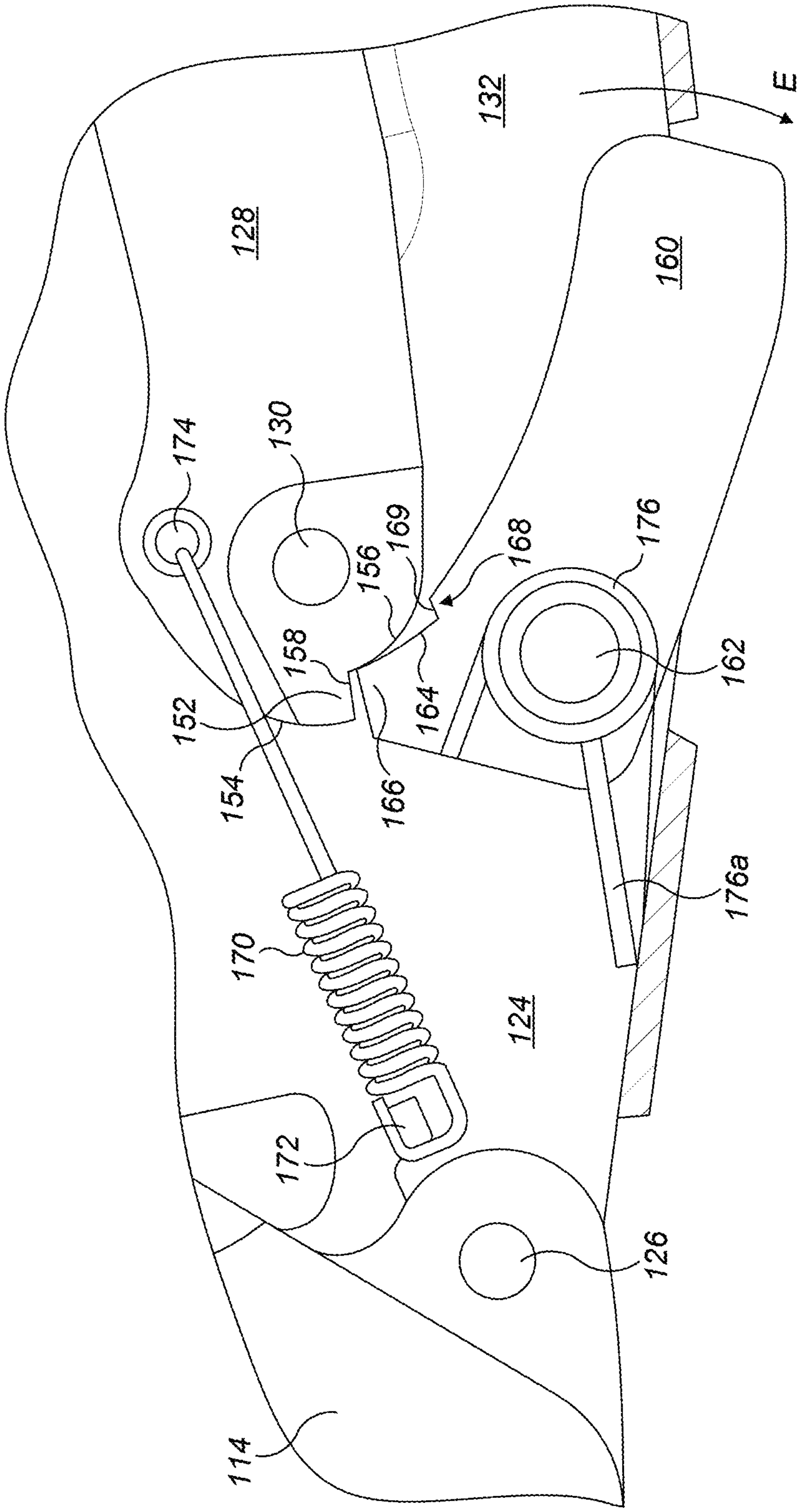
FIG. 3 Prior Art
FIG. 3 shows a detail VI of FIG. 2.
Figure 4:
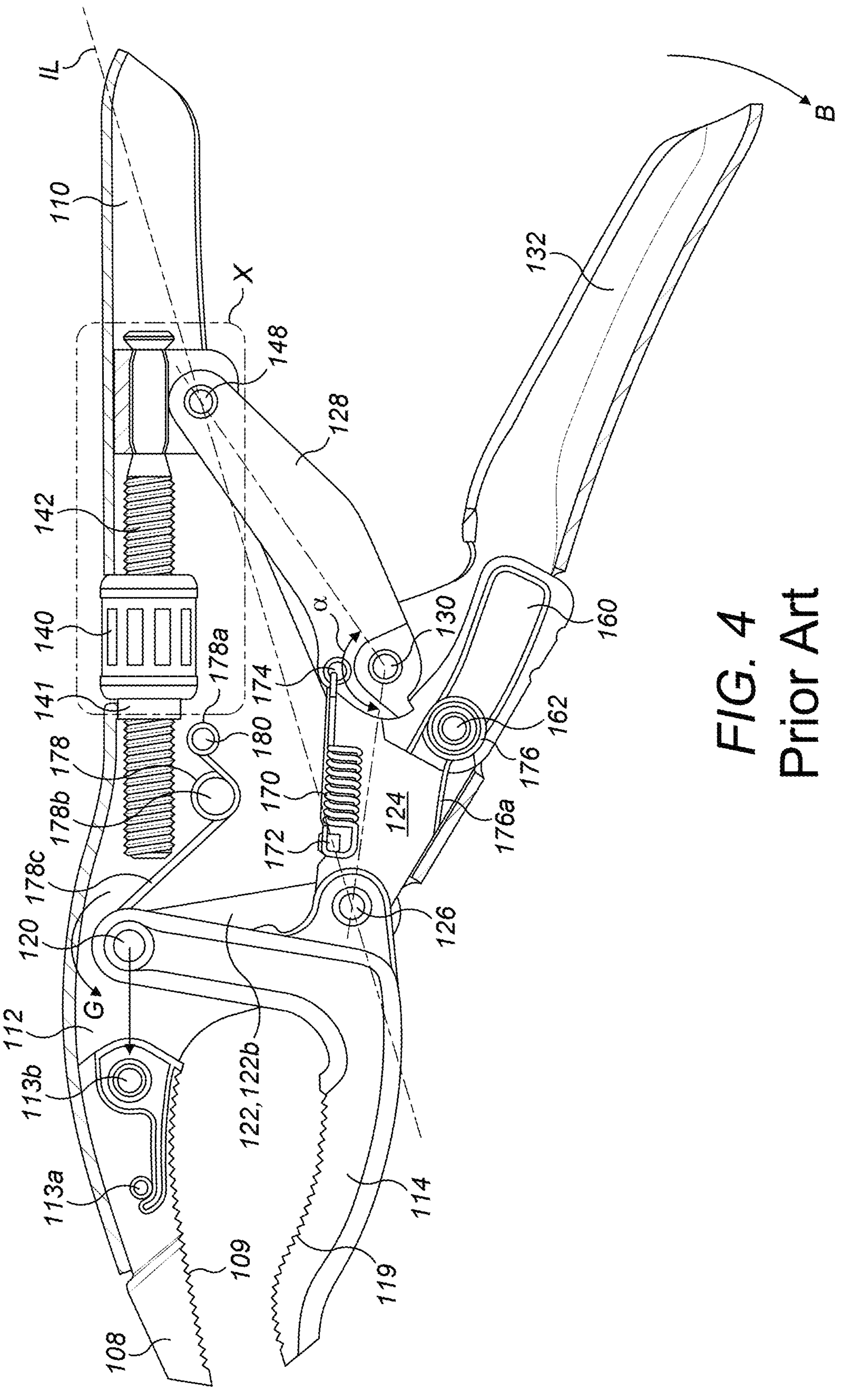
FIG. 4 Prior Art
FIG. 4 shows a side cutaway view of locking pliers according to the prior art in the open/unclamped position.
Figure 5:
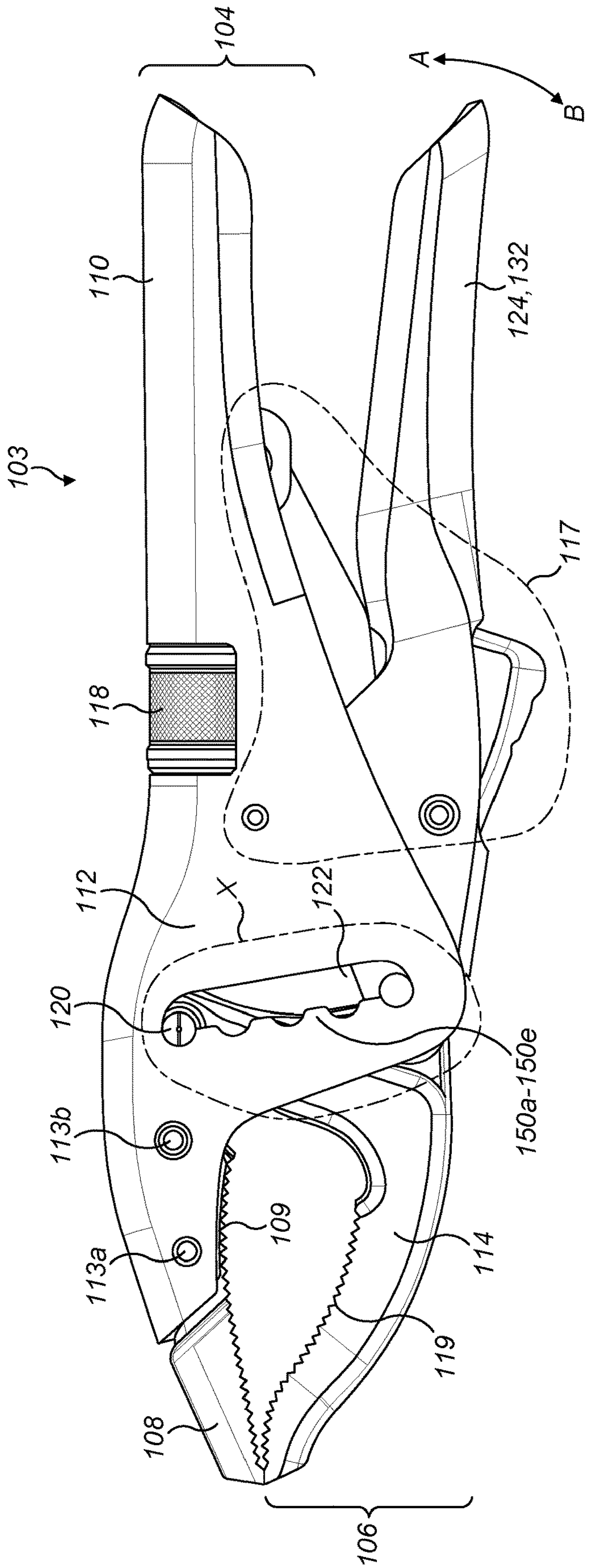
FIG. 5 shows a side elevation of the locking pliers of the present invention.
Figure 6:
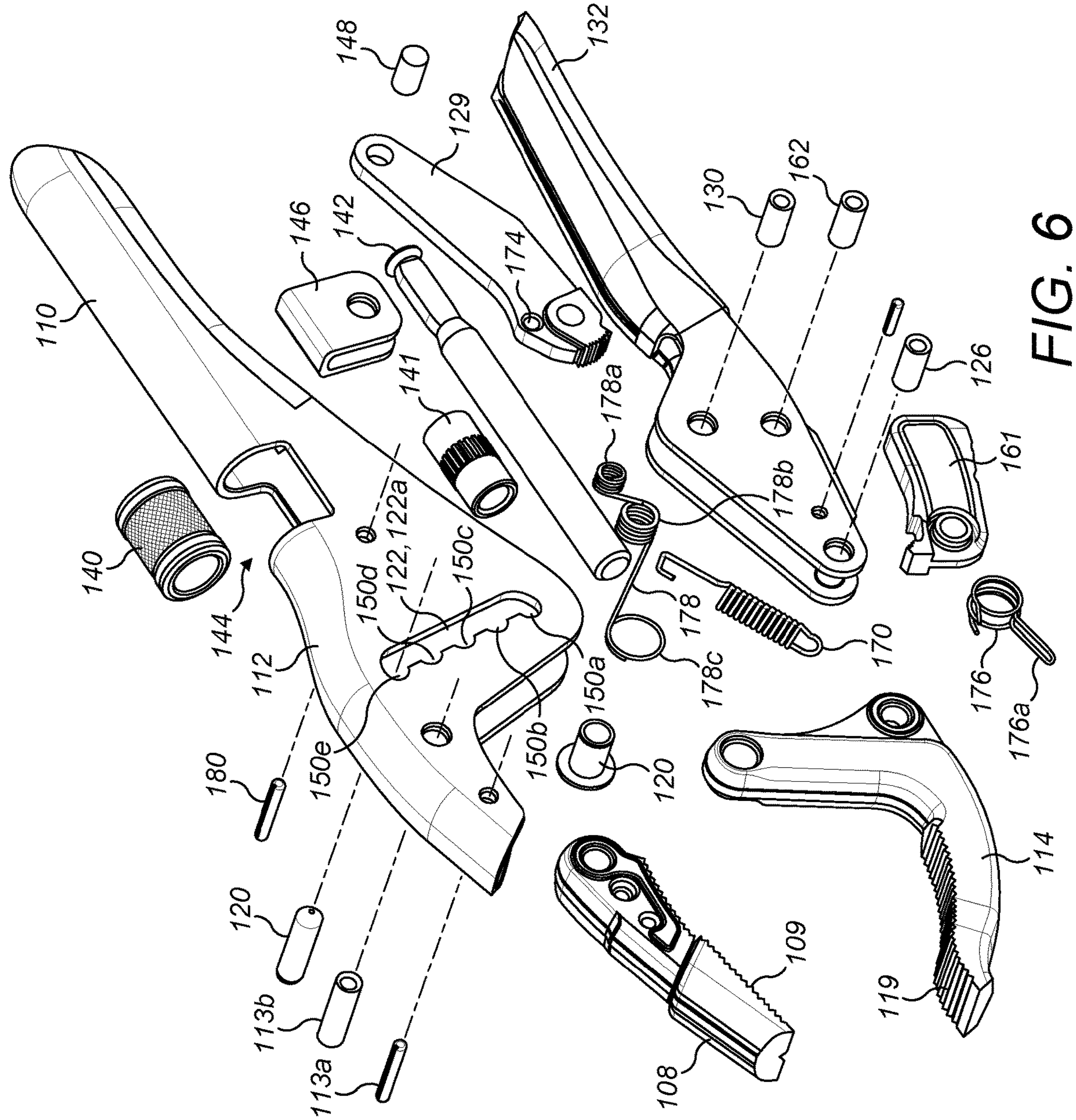
FIG. 6 shows an exploded view of the locking pliers of the present invention.
Figure 7:
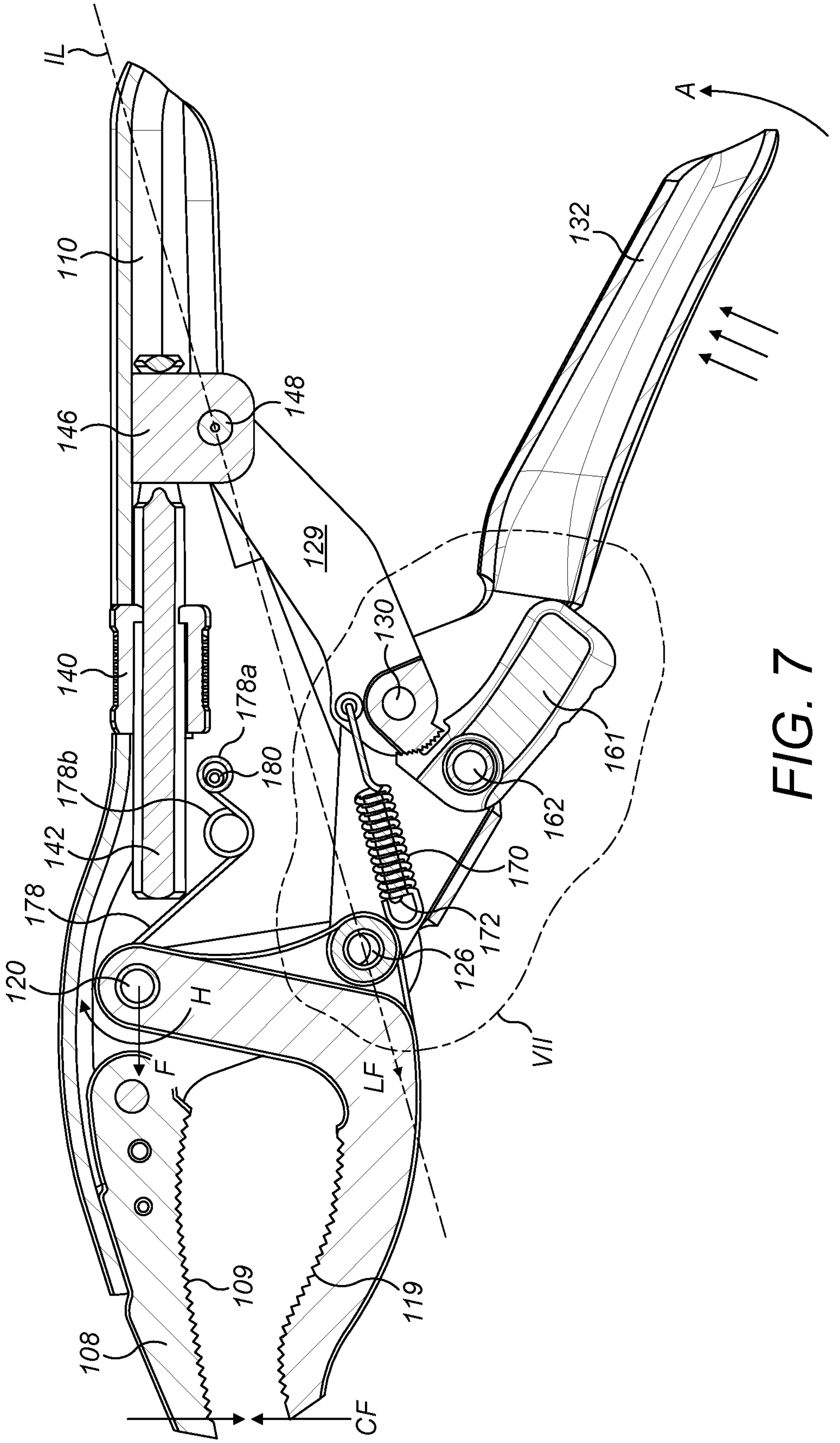
FIG. 7 shows a side cutaway view of locking pliers according to the present invention in a first locked/clamped position.

As illustrated in FIGS. 5-7, the locking pliers 103 is flat in overall shape and consists of an upper stationary assembly 104 and a lower movable assembly 106. The locking pliers 103 of the present invention are an improvement over the prior art. Thus, they share many of the same elements. For ease of reference, similar elements will share the same reference number.

The stationary assembly 104 is elongate with a front end part constituting a stationary jaw 108, a rear end part constituting a stationary handle 110, and an intermediate connecting part 112. The stationary handle 110 and the intermediate connecting 112 parts are formed of sheet metal shaped in a generally U-shaped cross-section. The stationary jaw 108 is formed of metal with an array of serrations 109 on its inside for gripping an object. The stationary jaw 108 is fastened to the intermediate connecting part 112 by a pair of rivets **113*a*, 113*b***.

The movable assembly 106 comprises a generally V-shaped movable jaw 114 and a latch lock mechanism 117 equipped with an adjusting device 118. The movable jaw 114 is formed of metal with an array of serrations 119 on its inside for gripping an object. The rear upper vertex of the movable jaw 114 is coupled to the stationary assembly 104 via a dowel 120. The dowel 120 is contained within a notched track 122 in the intermediate connecting part 112.

The latch lock mechanism 117 comprises an operating lever 124, the front end of which is coupled to the lower vertex of the movable jaw 114 by a first pivot 126 formed by a first axle. The midpoint of the operating lever 124 is coupled to the front end of an actuation rod 129 by a second pivot 130 formed by a second axle. The rear end of the operating lever 124 is elongate and forms a second, movable handle 132 situated underneath the stationary handle 110. Referring in particular to FIG. 5, the movable handle 132 is manually pivotable toward the stationary handle 110, in the direction of arrow A, and away from the handle 110, in the direction of arrow B.

The adjustment device 118 comprises a knurled cylinder 140 fixed around a threaded nut 141 and a screw 142 which passes through the nut 141. The cylinder 140 and the nut 141 are coaxial with a longitudinal axis 143 of the screw 142. The cylinder 140 is accommodated in a recess 144 in the handle 110 opening towards the top of the handle 110. The nut 141 is axially offset in relation to the cylinder 140 so that a front portion **141*a* of the nut 141 protrudes from the front end of the cylinder 140. The front portion 141*a* protrudes beyond the recess 144 and inside the stationary handle 110. The handle 110 acts as a collar about the front portion 141*a* which retains the cylinder 140 and the nut 141 within the recess 144 should the nut 141 ever threadingly disengage from the screw 142. The rear end of the cylinder 140 has an internal diameter restriction 140*a* which abuts the rear end of the nut 141. The restriction 140*a* prevents the nut 141 from withdrawing further rearwardly inside the cylinder 140**.

The cylinder 140 is accessible through the recess 144. The cylinder 140 and the nut 141 can be manually rotated about the longitudinal axis 143 of the screw 142 whilst being held captive in the recess 144 of the stationary handle 110 and being prevented from translational movement relative to the stationary handle 110. The rear end of the screw 142 passes, able to rotate freely, through the clevis piece 146 which is coupled to the rear end of the actuation rod 129 by a third pivot 148. Rotation of the knurled cylinder 140 and the nut 141 causes forward or backward translation of the screw 142, and the latch lock mechanism 117 coupled thereto, to pivot the movable jaw 114 about the first pivot 126 to perform fine adjustment of the jaws' gripping capacity.

The notched track 122 is a pair of identical mutually aligned notched windows 122*a*,122*b* each window passing through an opposite side faces of the U-shaped intermediate connecting part 112. Each window 122*a*,122*b* has, on a front side facing the jaws 108,114, a series of five notches 150*a*-150*e*. There may be at least two notches depending on how wide the jaws are designed to open from each other. Each pair of mutually aligned notches 150*a*-150*e* is suitable for supporting and cradling the dowel 120 when jaws are clamped and the latch lock mechanism 117 is in a locked position. When the jaws are unclamped and the latch lock mechanism 117 is in an unlocked position, the dowel 120 is slideable between notches 150*a*-150*d* to perform coarse adjustment of the jaws' gripping capacity.

The front end of the actuation rod 129 includes portion defining an upper arc 202 that is centered on the second pivot 130. The upper arc 202 includes a series of teeth 204 and a stop face 206. Stop face 206 is positioned to extend substantially radially from the second pivot 130. The front end of the actuation rod 129 further includes a portion defining a lower arc 208. The lower arc 208, which is positioned adjacent to the stop face 206, is also centered on the second pivot 130. However, the lower arc 208 has a smaller radius than the upper arc 202.

The latch lock mechanism 117 also comprises a locking/unlocking catch 161 coupled to the operating lever 124 by an axle 162 located close to the second pivot 130. The catch 161 includes an inner side 210. The inner side 210 is positioned to be facing upward toward the stationary handle 110. The inner side 210 includes a recess 212 positioned between series of teeth 214, and a stop face 216. Teeth 214 are configured to slidingly engage teeth 204 in a ratcheting fashion, wherein the teeth 204, 214 allow rotation of the actuation rod in a first direction (clockwise as shown in the figures) but not in a second direction (anti-clockwise as shown in the figures). Stop face 216 is configured to engage stop face 206 and prevent further rotation of the actuation rod in the first direction.

Catch 161 further includes an outer side that defines a trigger surface 218. Trigger surface 2018 is configured to be engaged the forefinger of an operator to selectively allow the catch 161 to be pivoted around axle 162.

The latch lock mechanism 117 comprises a traction spring 170 hooked under tension between a finger 172 on the operating lever 124 (located just behind the first pivot 126) and an eyelet 174 in the actuation rod 128 (located just above the second pivot 130).

Figure 10:
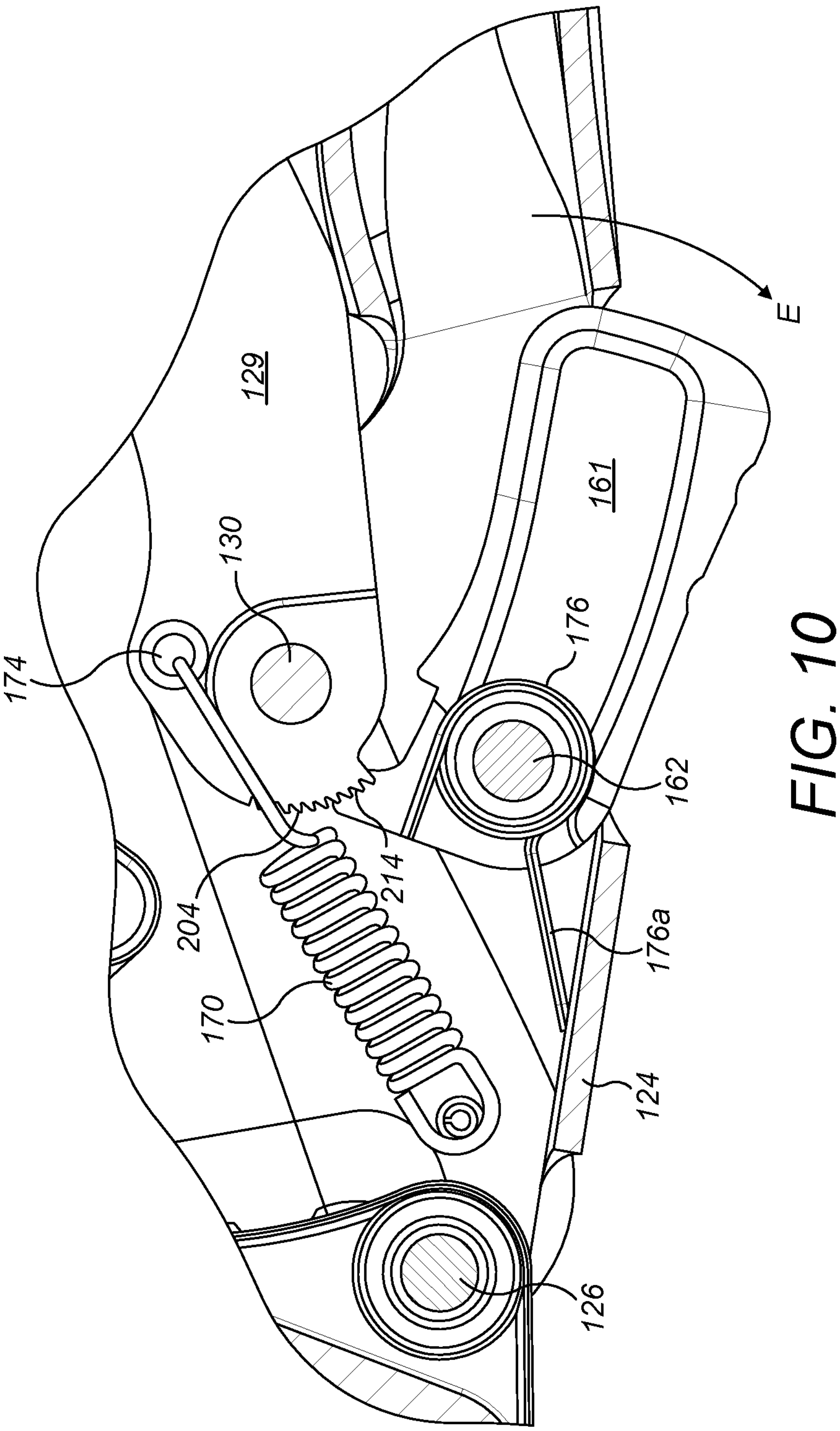
FIG. 10 shows a detail of VIII of FIG. 9.
Figure 11:
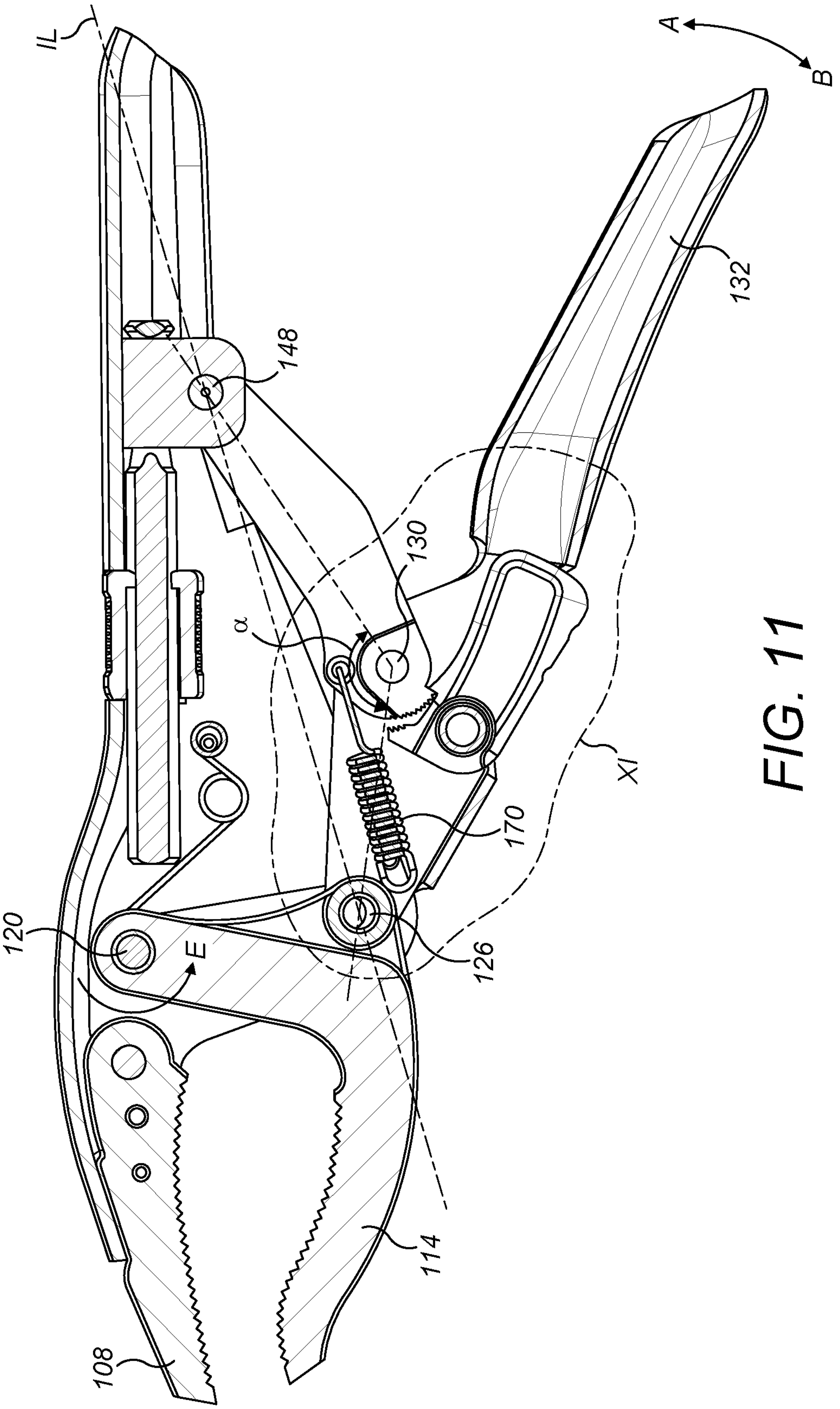
FIG. 11 shows a side cutaway view of the locking pliers of the present invention in the open/unclamped position.

As best seen in FIG. 10, the latch lock mechanism 117 comprises a double torsion spring 176 mounted upon the axle 162 and fixed to the catch 161. A protruding part 176*a* of the double torsion spring 176 acts upon the operating lever 124 such that the catch 161 is biased by the double torsion spring 176 to rotate in a clockwise direction E about the axle 162. The trigger surface 218 of the catch 161 protrudes slightly from the movable handle 132.

The latch lock mechanism 117 further includes a single torsion spring 178 the rear end 178*a* of which is mounted upon a finger 180 on the intermediate connecting part 112. A middle coil 178*b* of the single torsion spring 178 is unattached. A forward protruding part 178*c* of the single torsion spring 176 acts upon the dowel 120 such that the dowel 120 is biased by the single torsion spring 178 in a generally forward direction of arrow F, as is shown in FIG. 7. The forward bias of the single torsion spring 178 is only just enough to reliably retain the dowel 120 in a notch 150*a*-150*e* when the jaws are unclamped.

Figure 12:
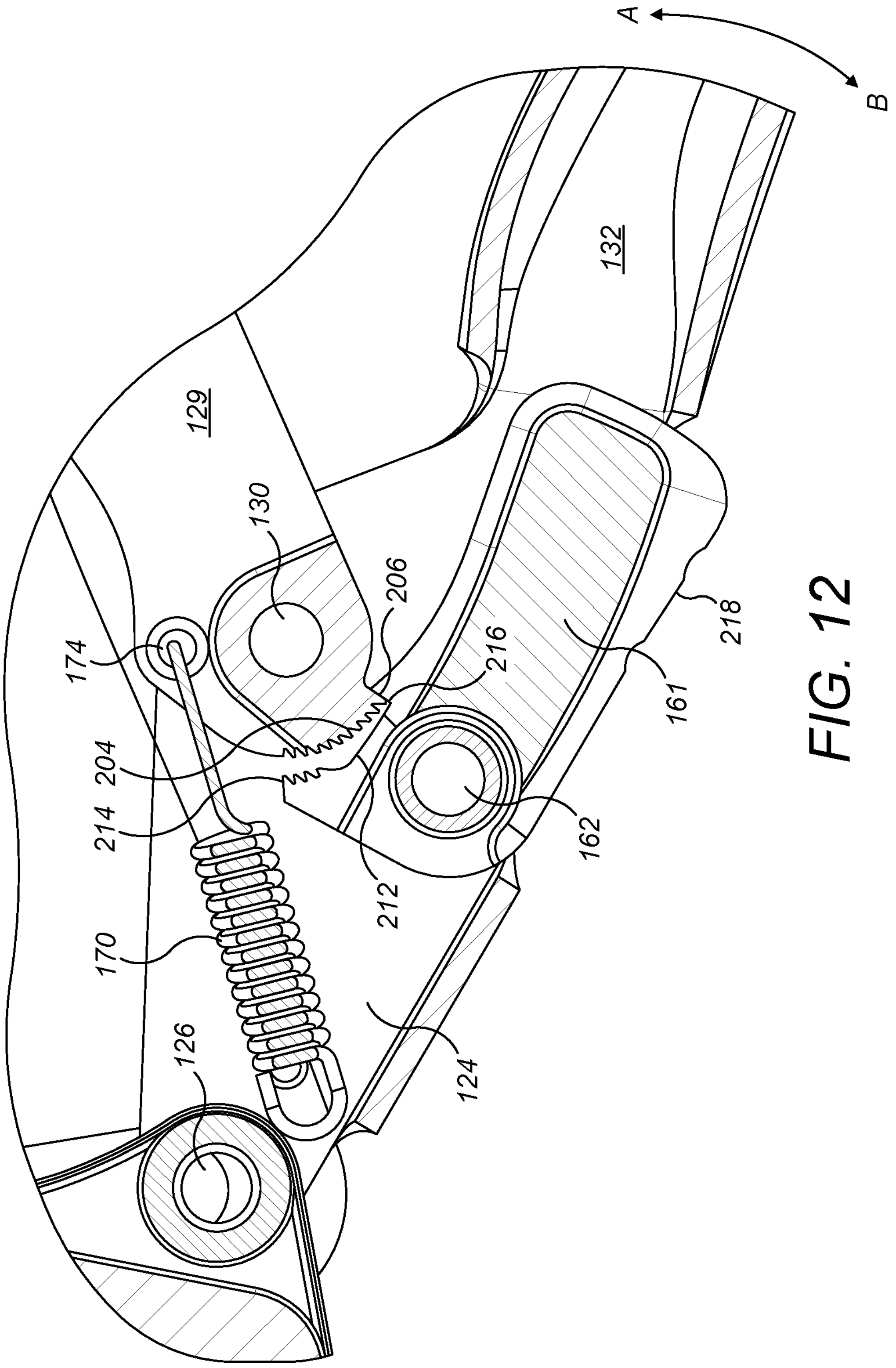
FIG. 12 shows a detail of IX of FIG. 11.

When the locking pliers 103 is not in use, tension in the traction spring 170 pulls the second pivot 130 away from an imaginary line IL between the first 126 and third 148 pivots. This reduces the distance between the first 126 and third 148 pivots which causes the movable jaw 114 to pivot about the dowel 120 (in the anti-clockwise direction of arrow G) away from the stationary jaw 108 and the movable handle 132 to pivot about the first pivot 126 (in the direction of arrow B) away from the stationary handle 110. It also causes a reduction in a locking angle α enclosed by the first 126, second 130 and third 148 pivots. The jaws 108,114 are either in, or moving towards, an open position like that shown in FIG. 11. In this open position, as best seen in FIG. 12, the stop face 206 of the actuation rod 129, is in direct engagement against the stop face 216 of the catch 161. To accommodate this position, the teeth 214 of the catch are completely disengaged from the teeth 204 of the actuation rod 129. Recess 212 provides the clearance to allow teeth 204 to avoid contact with the catch 161, while simultaneously permitting the stop faces 206, 216 to be engaged to one another. This prevents the two handles 110, 132 from moving further apart.

Figure 8:
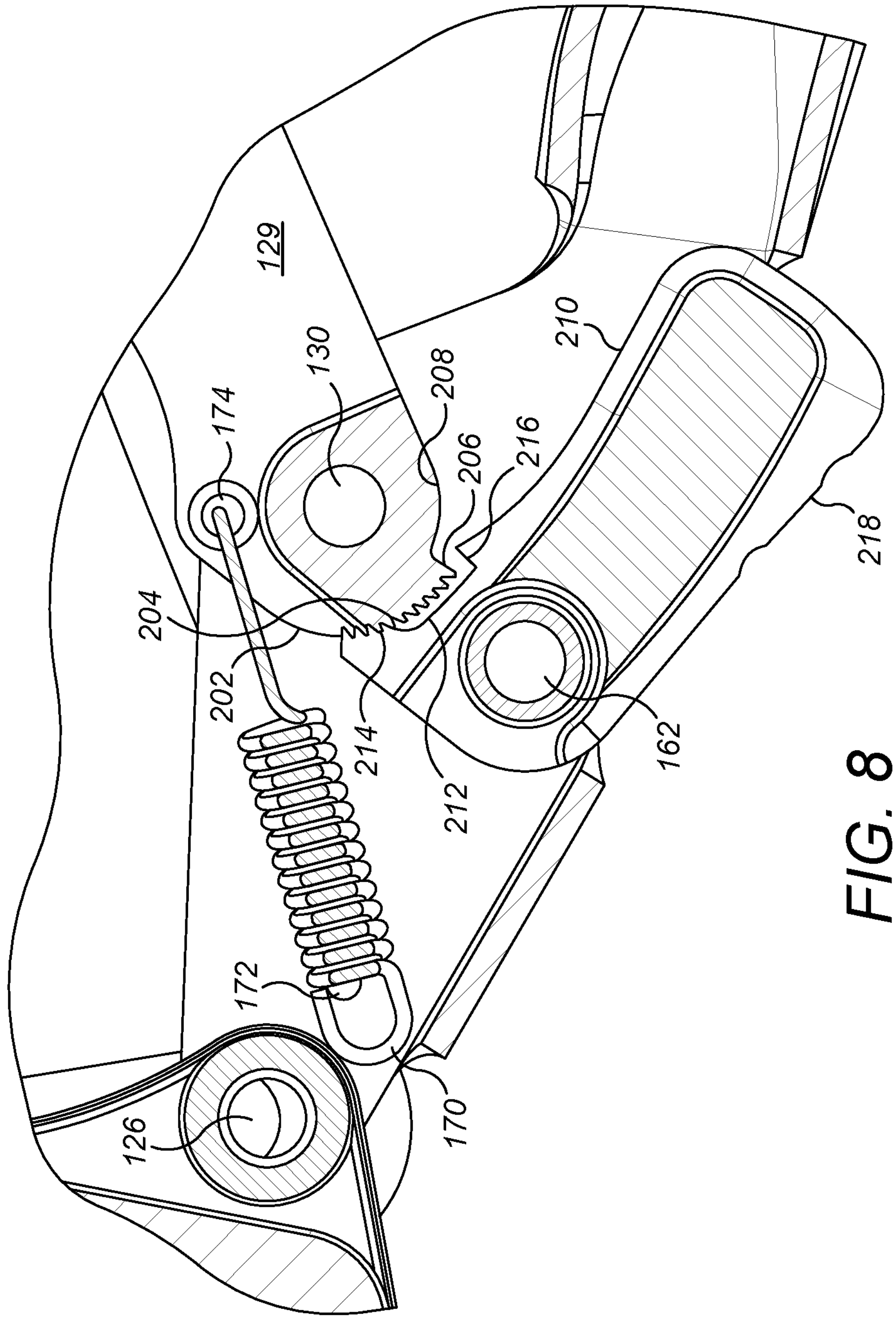
FIG. 8 shows a detail of VII of FIG. 7.

The lower part of the catch 161 forms a trigger surface 218 that protrudes slightly beneath the movable handle 132. When the locking pliers 103 are in use, the operator, using all four fingers, begins to pull the movable handle 132 closer to the stationary handle 110 (in the direction of arrow direction A) which is wedged firmly in the palm of the operator's hand. The second pivot 130 moves towards the imaginary line IL between the first 126 and third 148 pivots. This increases the distance between the first 126 and third 148 pivots which causes the movable jaw 114 to pivot about the dowel 120 (in the clockwise direction of arrow H) towards the stationary jaw 108 and the movable handle 132 to pivot about the first pivot 126 (in the direction of arrow A) towards the stationary handle 110. The locking angle α gradually widens, and the movable jaw 114 rotates about the dowel 120. Thus, the jaws 108,114 move towards a closed position like that shown in FIG. 7 and begin to clamp an object. Tension in the traction spring 170 gradually increases. The tension in spring 170 pulls the teeth 204 into engagement with the teeth 214 of catch 161. When the teeth 204 and 214 come into engagement with one another, as shown in FIGS. 7 and 8, the operator hears the first of several audible clicks. This click is an indication that teeth 204, 214 are engaged and that an object can be firmly clamped between the jaws 108, 114. As the operator firmly clamps the object between the jaws 108, 114, the locking angle α slightly increases to a degree wherein the actuation rod 129 is locked. Thus, rotation of the actuation around the first pivot is permitted in a first direction (clockwise) but prevented in the opposite direction (anti-clockwise). Stresses due to clamping plus tension in the traction spring 170 tend to reduce the locking angle α. However, because of the engagement of teeth 204, 204, the reduction of the locking angle α is prevented. Thus, the locking pliers 103 have reached the first of several stable locking or clamping positions. In this position, the trigger protrudes further beneath the movable handle 132. The snap-fastening can be felt by the operator's index finger.

If the object to be clamped is smaller, the operator can continue to move handles 110 and 132 closer to one another. Due to the fact that teeth 204 and 214 engage one another in a ratchet type fashion, additional stable locking or clamping positions can be achieved. The number of positions could theoretically be infinite. However, practical limitations such as machining tolerances and the strength of materials used in manufacturing make it preferable to have between 2 and 10 clamping positions. Even more preferable are between 2 and 7 clamping positions. See FIGS. 9 and 10.

As each incremental locking or clamping position is achieved, the moving jaw 114 moves closer to the stationary jaw 108. In each locking or clamping position, the double torsion spring 176 urges the catch 160 to pivot in a clockwise direction E about the axle 162. Teeth 204 and 214 engage each another with a force which is substantially perpendicular to the imaginary line IL between the first 126 and third 148 pivots. If the operator pulls the two handles 110,132 even closer together, the movable handle's abutment point 184 will move into abutment with the actuation rod's abutment point 182 before the second pivot 130 passes the imaginary line IL between the first 126 and the third 148 pivots. This guarantees that the second pivot 130 never passes the imaginary line IL.

In each of the locking or clamping positions, when the operator releases the movable handle 132, the locking pliers 103 adopts the stable clamped position under the bias of the traction spring 170. The lock mechanism 117 exerts a locking force LF in a clockwise direction about the dowel 120 which is counteracted by a clamping force CF between the jaws 108,114.

To release the object clamped between the jaws 108,114, the operator takes hold of the locking pliers 103, pulls the handles 110,132 slightly closer together until the movable handle's abutment point 184 moves into abutment with the actuation rod's abutment point 182. The operator presses a finger on the trigger surface 218 of the catch 161 to disengage teeth 204, 214 and then releases the movable handle 132 to allow the jaws 108,114 to open automatically. This opening is caused by tension in the traction spring 170 which tends to pull the first 126 and third 148 pivots together, push the second pivot 130 away from the imaginary line IL and rotate the movable jaw 114 away from the stationary jaw 108 in the anti-clockwise direction of arrow G. The most wide-open position is delimited by abutment between the catch's stop face 216 and the actuation rod's stop face 206. See FIGS. 11 and 12.

Thus, the elastic energy stored up upon clamping is released while the operator retains firm grip and control of the handles 110,132 and this helps to reduce, or even avoid, an explosive reaction to the hand.

Figure 9:
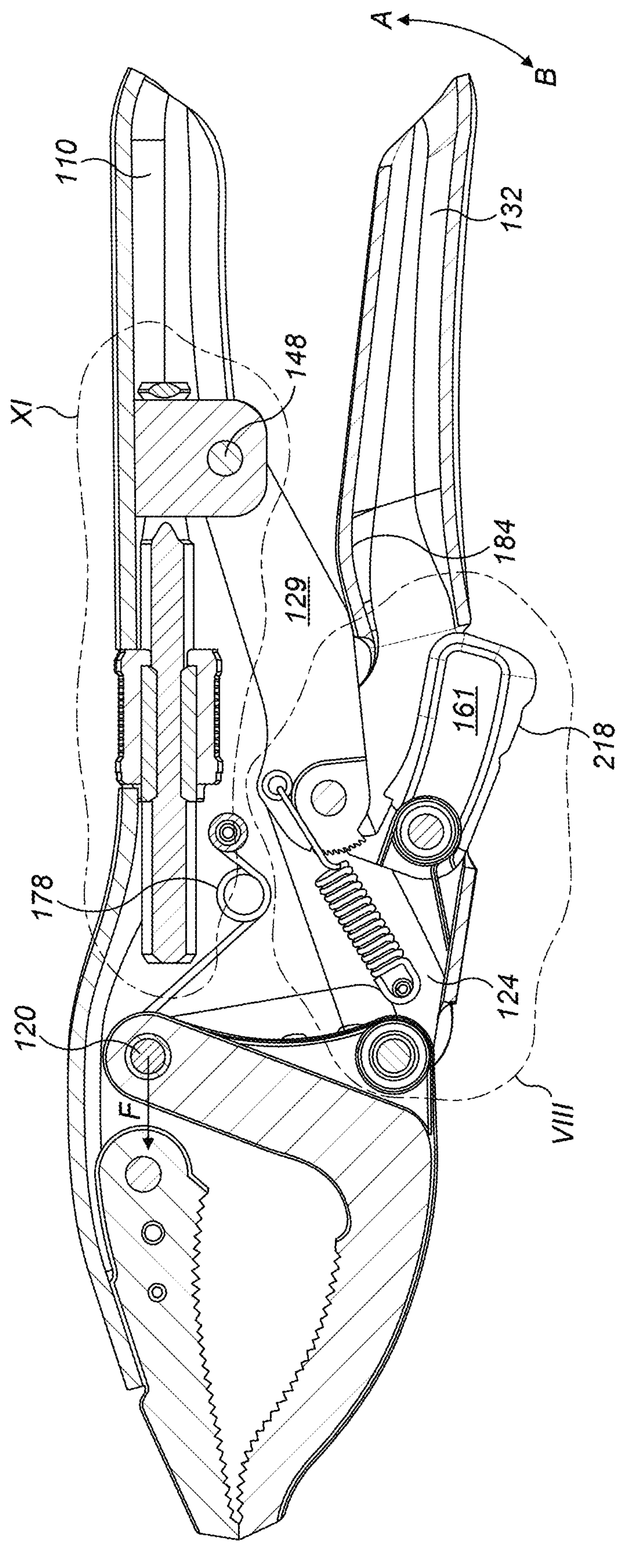
FIG. 9 shows a side cutaway view of the locking pliers according to the present invention in a second locked/clamped position.

Referring in particular to FIG. 9, when the stationary 110 and movable 132 handles are moved together, the operating lever 124 and actuation rod 128 abut at their mutual abutment points 182,184 and rotate a small distance in unison in the anti-clockwise direction of arrow A about the third pivot 148. With the present invention, the single torsion spring 178 only lightly urges forward movement of the dowel 120 towards the notches 150*a*-150*e* in the direction of arrow F. The dowel may be unseated from a notch and moved downwardly simply by an operator pulling the stationary 110 and movable 132 handles together and, in doing so, overcoming the bias of the single torsion spring 178. Also, with the present invention, the dowel 120 may be unseated, and moved in an upward direction, simply by the operator squeezing the stationary 108 and movable 114 jaws together and, again, overcoming the bias of the single torsion spring 178.

Figure 13:
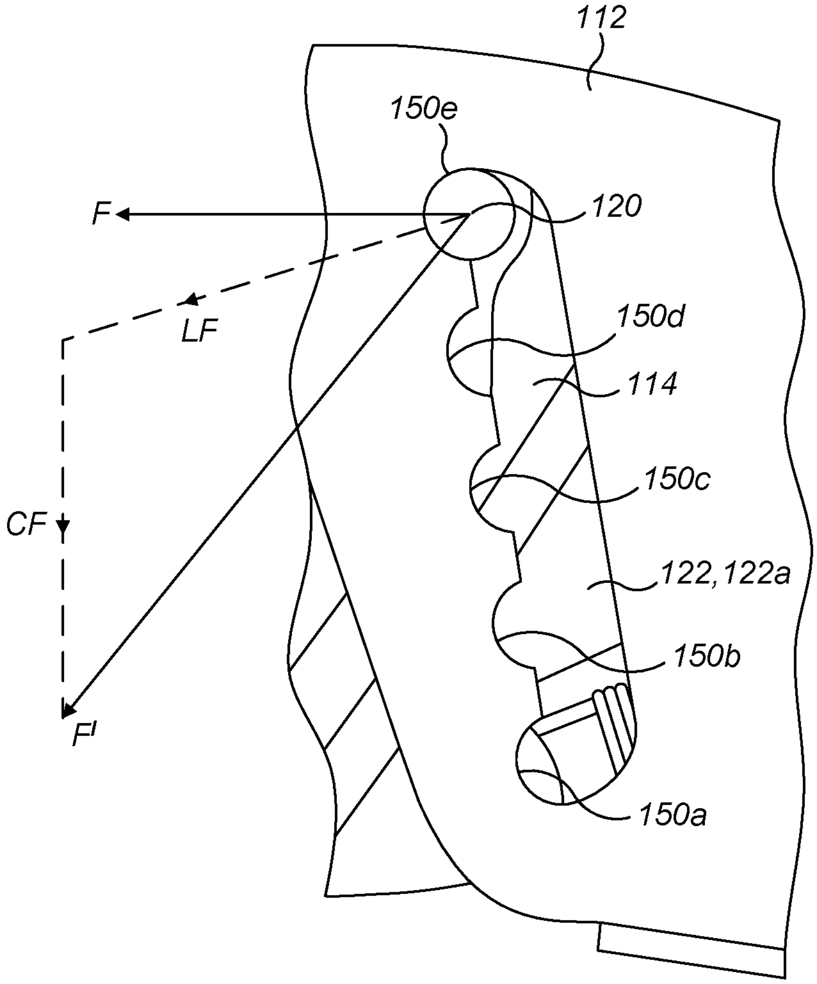
FIG. 13 shows a detail of X of FIG. 5.
Figure 14:
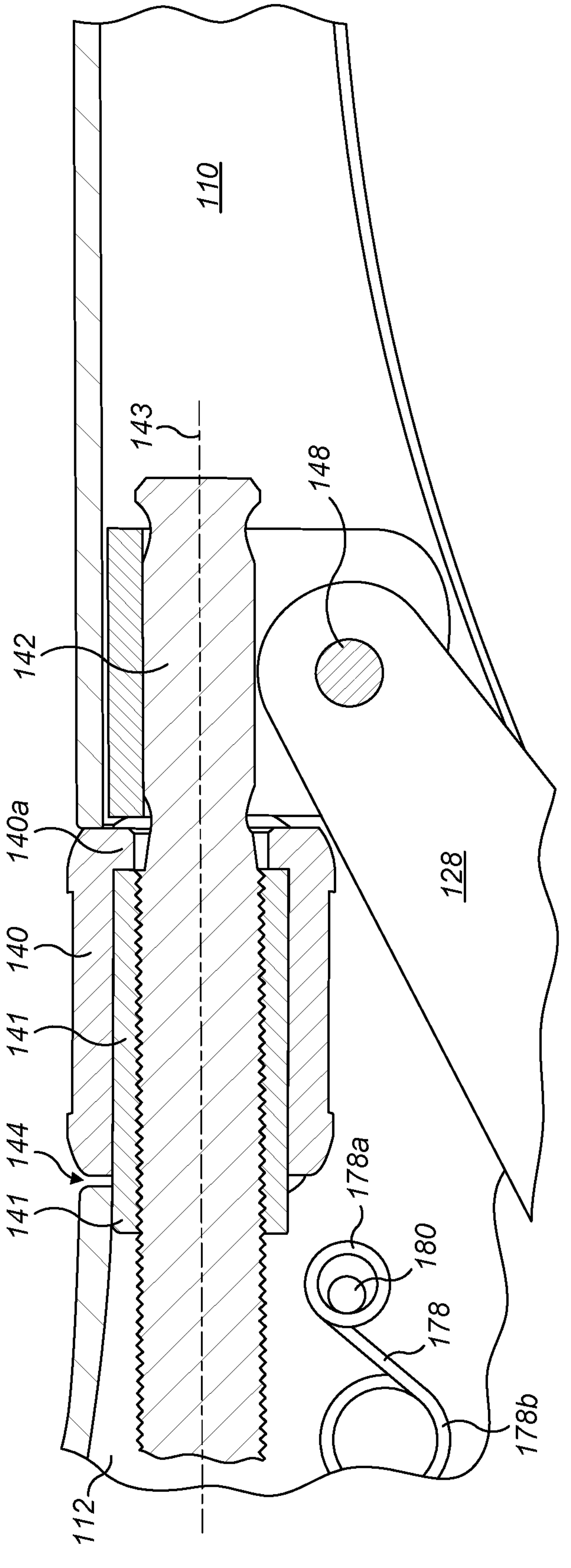
FIG. 14 shows detail XI of FIG. 9.

Referring to FIG. 13, each notched window 122*a*, 122*b* in opposite sides of the intermediate connecting part 112 of the stationary assembly 104 is a generally elongate channel with one straight side opposite its notches 150*a*-150*e*. The straight side assists sliding movement of the dowel between notches when the jaws are unclamped. The dowel 120 is the axis of the movable jaw 114 which, as mentioned above, acts as a trunion. The dowel is supported by the notches 150*a*-150*e* which are shaped to resist lateral displacement of the dowel between the notches whether the jaws 108,114 be clamped or unclamped. For example, when the jaws are unclamped, the single torsion spring 178 exerts force F on the dowel 120 which is directed towards the notches 150*a*-150*e* which support the dowel 120. Even if the single torsion spring 178 were absent, which is an option, the notched windows 122*a*, 122*b* are inclined forwardly so that notches 150*a*-150*e* would tend to support the dowel 120. When the jaws 108,114 are clamped, the force F' produced on the dowel 120 by a combination of the clamping force CF and the locking force LF is also directed towards the notches 150*a*-150*e*.

The components of the locking pliers 103 can be made of cut, stamped, pressed then assembled sheet metal. The locking pliers 103 are often used for bringing together metal objects and holding them with a view to welding them.

The example and alternative embodiments described above may be combined in a variety of ways with each other. It should be noted that the present invention may, however, be embodied in many different forms and should not be construed as limited to the embodiments set forth herein; rather, the embodiments set forth herein are provided so that the disclosure will be thorough and complete, and will fully convey the scope of the invention to those skilled in the art. Furthermore, the steps and number of the various steps illustrated in the figures may be adjusted from that shown. The accompanying figures and attachments illustrate exemplary embodiments of the invention.

Although the present invention has been described in terms of particular example and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the example and alternative embodiments described above can be configured without departing from the scope and spirit of the invention. Therefore, it is to be understood that, within the scope of the appended claims, the invention may be practiced other than as specifically described herein.

I claim:

1. A locking pliers, comprising:

a stationary assembly having a rear end forming a stationary handle and a front end forming a stationary jaw;

a movable assembly having a movable jaw that is incrementally movable relative to the stationary jaw and pivotally coupled to the stationary assembly by a dowel that serves as a jaw axis which enables clamping of an object between the movable jaw and stationary jaw, the movable assembly having a latch lock mechanism including:

an operating lever having a front end that is pivotally coupled to the movable jaw at a first pivot, and a rear end that forms a movable handle, an actuation rod pivotally coupled to the operating lever and the stationary handle at a second pivot, the actuation rod having a front end defining an arc, a first series of teeth formed on the arc terminating with and a first stop face, the front end also defines a lower arc positioned adjacent the first stop face, and a catch arranged on and directly coupled to the operating lever, the catch including an outer side and an inner side, the outer side defining a trigger surface configured for user-engagement to selectively allow pivoting of the catch, the inner side having a second series of teeth formed on a distal end of the inner side, a second stop face formed on a proximal end of the inner side, and a recess positioned between the second series of teeth and the second stop face, the second series of teeth being configured to engage the first series of teeth to place the latch lock mechanism between one of a plurality of incremental locked positions, and allow rotation of the actuation rod which incrementally moves the movable jaw towards the stationary jaw in a manner that holds the movable jaw and the stationary jaw in a fixed, clamped position; and wherein in an open, unclamped position, the first series of teeth and the second series of teeth are completely disengaged and the recess provides clearance to allow the first series of teeth to avoid contact with the catch, while simultaneously permitting the first stop face to be in the direct engagement with the second stop face to thereby prevents the stationary handle and the movable handle from moving further apart.

2. The locking pliers of claim 1, wherein the first series of teeth and the second series of teeth are configured to engage each other to permit multiple clamping positions in which the movable jaw and the stationary jaw are held in a fixed, clamped arrangement.

3. The locking pliers of claim 1, wherein the lower arc has a radius that is less than a radius of the upper arc.

4. The locking pliers of claim 1, wherein the engagement of the first series of teeth and the second series of teeth allows rotation of the actuation rod in a first direction that establishes the clamped position between the movable jaw and the stationary jaw.

5. The locking pliers of claim 4, wherein the second stop face is configured to engage first stop face and prevent further rotation of the actuation rod in the first direction.

6. The locking pliers of claim 4, wherein rotation of the actuation rod in a second direction opposite to the first direction moves the stationary jaw and the movable jaw from a clamped position to said open, unclamped position.

7. The locking pliers of claim 6, wherein in the open, unclamped position, the first stop face is in direct engagement with the second stop face.

8. The locking pliers of claim 1, wherein in the open position, the direct engagement of the first stop face and the second stop face delimits a most wide-open position of the stationary jaw and the movable jaw.

9. The locking pliers of claim 1, wherein the engagement of the first series of teeth and the second series of teeth produces an audible click that an object can be clamped between the stationary jaw and the movable jaw.

* * * * *